United States Patent
Marijsse

(10) Patent No.: US 10,767,295 B2
(45) Date of Patent: Sep. 8, 2020

(54) METHOD OF PREPARING A TUFTING PROCESS

(71) Applicant: Vandewiele NV, Kortrijk/Marke (BE)

(72) Inventor: Frank Marijsse, Kortrijk (BE)

(73) Assignee: VANDEWIELE NV, Kortrijk/Marke (BE)

( * ) Notice: Subject to any disclaimer, the term of this patent is extended or adjusted under 35 U.S.C. 154(b) by 162 days.

(21) Appl. No.: 15/763,221

(22) PCT Filed: Sep. 15, 2016

(86) PCT No.: PCT/EP2016/071862
§ 371 (c)(1),
(2) Date: Mar. 26, 2018

(87) PCT Pub. No.: WO2017/055099
PCT Pub. Date: Apr. 6, 2017

(65) Prior Publication Data
US 2018/0282928 A1  Oct. 4, 2018

(30) Foreign Application Priority Data

Sep. 28, 2015 (EP) .................................... 15187113

(51) Int. Cl.
*D05C 15/26* (2006.01)
*G05B 15/02* (2006.01)

(52) U.S. Cl.
CPC ............ *D05C 15/26* (2013.01); *G05B 15/02* (2013.01)

(58) Field of Classification Search
CPC ........ D05C 15/00; D05C 15/36; G05B 15/02; G06F 19/00
See application file for complete search history.

(56) References Cited

U.S. PATENT DOCUMENTS

| | | | | | |
|---|---|---|---|---|---|
| 2,966,866 A | * | 1/1961 | Card | ...................... | D05C 15/18 |
| | | | | | 112/80.73 |
| 3,067,701 A | * | 12/1962 | Wilcox | .................. | D05C 15/26 |
| | | | | | 112/80.24 |
| 3,943,865 A | * | 3/1976 | Short | ...................... | D05B 51/00 |
| | | | | | 112/80.24 |

(Continued)

FOREIGN PATENT DOCUMENTS

GB        2 319 786        6/1998

OTHER PUBLICATIONS

European Search Report for European application No. 15 18 7113, dated Nov. 19, 2015; 5 pages.

(Continued)

*Primary Examiner* — Ismael Izaguirre
(74) *Attorney, Agent, or Firm* — Rankin, Hill & Clark LLP

(57) ABSTRACT

A method of preparing a tufting process comprises the steps of:
 a) providing a pattern representation representative of a fabric to be tufted,
 b) providing at least one group of tufting aspect instruction layers, each group of tufting aspect instruction layers comprising at least one tufting aspect instruction layer, each tufting aspect instruction layer being associated with a tufting aspect instruction, each tufting aspect instruction referring to a tufting aspect,
 c) assigning at least one tufting aspect instruction to at least one tufting aspect instruction layer.

15 Claims, 4 Drawing Sheets

(56) References Cited

U.S. PATENT DOCUMENTS

| | | | | |
|---|---|---|---|---|
| 4,522,137 | A * | 6/1985 | Takenoya | D05B 19/10 |
| | | | | 112/453 |
| 6,587,745 | B1 * | 7/2003 | Polden | D05B 19/08 |
| | | | | 112/475.19 |
| 2007/0272137 | A1 | 11/2007 | Christman et al. | |
| 2009/0101051 | A1 * | 4/2009 | Christman, Jr. | D05C 15/18 |
| | | | | 112/80.23 |
| 2009/0260554 | A1 | 10/2009 | Hall et al. | |
| 2014/0331906 | A1 * | 11/2014 | Hall | D05C 15/12 |
| | | | | 112/475.23 |
| 2015/0005921 | A1 * | 1/2015 | Abe | D05B 19/08 |
| | | | | 700/138 |

OTHER PUBLICATIONS

Written Opinion and International Search Report for International application No. PCT/EP2016/071862, dated Nov. 25, 2016; 10 pages.

* cited by examiner

METHOD OF PREPARING A TUFTING PROCESS

The present invention relates to a method of preparing a tufting process.

When tufting fabrics, such as carpets, a tufting machine control file is generated on the basis of a plurality of tufting aspect instructions indicating, for example, which type of pile with which pile height has to be generated at a particular location of the fabric to be tufted.

It is an object of the present invention to provide a method of preparing a tufting process by means of which the information necessary for carrying out a tufting process can easily be provided and, if necessary, substituted for other information at particular locations of the fabric to be tufted.

According to the present invention, this object is achieved by a method of preparing a tufting process, comprising the steps of:

a) providing a pattern representation representative of a fabric to be tufted;
b) providing at least one group of tufting aspect instruction layers, each group of tufting aspect instruction layers comprising at least one tufting aspect instruction layer, each tufting aspect instruction layer being associated with a tufting aspect instruction, each tufting aspect instruction referring to a tufting aspect;
c) assigning at least one tufting aspect instruction to at least one tufting aspect instruction layer.

The method of the present invention is based on the provision of one or a plurality of groups of tufting aspect instruction layers. Each such tufting aspect instruction layer constitutes an entity of information representing those areas of the pattern representation and the fabric to be tufted, respectively, at which one particular tufting aspect instruction is intended to occur. By assigning different tufting aspect instructions to different tufting aspect instruction layers, areas of a fabric to be tufted on the basis of the same tufting aspect instruction can easily and clearly be visualized, for example, on a monitor or a TV screen. If necessary, at one or a plurality of locations in the various tufting aspect instruction layers, the assignment of the tufting aspect instructions can be changed for thereby changing the overall appearance of the fabric to be tufted.

In a tufted fabric, the pile height and the pile type are those aspects which, besides the color of the yarn used, primarily influence the appearance of a tufted fabric. Therefore, according to an advantageous aspect of the present invention, it is proposed that a first tufting aspect is the pile height and that a first tufting aspect instruction referring to the first tufting aspect indicates the height of a pile to be tufted, and/or that a second tufting aspect is the pile type and that a second tufting aspect instruction referring to the second tufting aspect indicates the type of a pile to be tufted.

When using the pile height and/or the pile type as the major aspects of the appearance of a fabric to be tufted, it is further proposed that each tufting aspect instruction layer of a first group of tufting aspect instruction layers represents areas of the pattern representation having the same first tufting aspect instruction associated therewith, and/or that each tufting aspect instruction layer of a second group of tufting aspect instruction layers represents areas of the pattern representation having the same second tufting aspect instruction associated therewith.

According to a further advantageous aspect of the present invention, it is proposed that:

step a) comprises providing the pattern representation as a pattern information representation representing the pattern of the fabric to be tufted, wherein the method further comprises:

a step $a_1$) of providing a group of pattern information layers on the basis of the pattern representation, said group of pattern information layers comprising at least one pattern information layer, each pattern information layer representing areas of the pattern information representation having the same pattern information associated therewith, and a step $a_2$) of providing at least one tufting instruction unit, each tufting instruction unit containing at least one tufting aspect instruction, step c) comprises assigning tufting instruction units to at least one pattern information layer and thereby assigning tufting aspect instructions of said tufting instruction units to the associated tufting aspect instruction layers.

According to this embodiment of the method of the present invention, the pattern information representation is preferably split up into a plurality of layers, the so-called pattern information layers, which again can be considered as being an entity of information. Each pattern information layer represents those areas of the fabric to be tufted, i.e. the pattern information representation, which is represented by the same pattern information. For example, the pattern information associated with the various pattern information layers could be the color of the particular areas of the fabric to be tufted such that, in association with each color to be used, one pattern information layer will be provided showing all those areas of the fabric to be tufted having the same color.

By providing at least one tufting instruction unit, one or a plurality of tufting aspect instructions, for example, the information about the pile height and/or the information about the pile type can easily be assigned to particular locations of the fabric to be tufted and can thereby be assigned to corresponding locations of the various tufting aspect instruction layers.

For assigning the information about the piles to be tufted, for example, to the entire area represented in a pattern information layer, at least one tufting instruction unit may repeatedly be assigned to the same pattern information layer.

As immediately adjacent piles may in common influence the appearance of a tufted fabric, according to a further aspect of the present invention, at least one tufting instruction unit may be associated with a group of piles to be tufted. This group may comprise at least one pile. Preferably, this group comprises a plurality of piles to be tufted simultaneously by means of immediately adjacent needles arranged on a needle bar of a tufting machine and/or comprises a plurality of piles to be tufted by means of immediately consecutive stitches of the same needle arranged on a needle bar of a tufting machine.

For clearly defining the piles to be tufted, a tufting instruction unit associated with a group of piles to be tufted may comprise, for each pile of this group of piles, a first tufting aspect instruction and a second tufting aspect instruction. For reducing the work necessary for defining each single pile to be tufted, according to a further aspect, in step b) at least one group of tufting aspect instruction layers may be provided such as to represent one predetermined default tufting aspect instruction in association with the entire fabric to be tufted.

When providing one or a plurality of pattern information layers, step c) may comprise substituting at least one default tufting aspect instruction for a tufting aspect instruction of a tufting instruction unit assigned to a pattern information layer.

According to a very advantageous aspect of the present invention, for example, after having defined all the piles to be tufted by providing the corresponding tufting aspect instructions, corrections may be carried out by substituting at least one tufting aspect instruction of at least one tufting aspect instruction layer for another tufting aspect instruction referring to the same tufting aspect.

For preparing a tufting process, it is essential to have information about the tufting machine which is to be used for carrying out the tufting process. Therefore, according to a further aspect of the present invention, the method may further comprise the step of selecting one of a plurality of tufting machines preferably having a predetermined yarn threading, and/or may comprise the step of determining a yarn threading to be used for tufting the fabric, the yarn threading defining the sequence of yarns in association with needles of a needle bar of a tufting machine.

The yarn threading may comprise a yarn repeat. At least one of the group of piles with which a tufting instruction unit is associated may be a group which is to be tufted with the yarns of one yarn repeat.

For having a clear relationship between the tufting instruction units and the piles which will be generated when applying such tufting instruction units, it is advantageous to define and/or select at least one tufting instruction unit, preferably all tufting instruction units, on the basis of the information contained in the pattern information layers and/or on the basis of the yarn threading.

For enabling a user to check the fabric which will be tufted on the basis of the tufting aspect instructions provided in the various tufting aspect instruction layers, according to a further aspect of the present invention, the method may further comprise the step of generating a visualization of a fabric to be tufted on the basis of the tufting aspect instructions contained in at least one of the tufting aspect instruction layers. When visualizing the fabric to be tufted, one or a plurality of the tufting aspect instruction layers may be shown on a monitor either separated from each other or superimposed to each other.

The method of the present invention may further comprise the step of generating a tufting machine control file on the basis of the tufting aspect instructions of all the tufting aspect instruction layers having tufting aspect instructions assigned thereto. This control file will be sent to the tufting machine used for carrying out the tufting process and will contain all the information necessary for controlling systems of such a tufting machine which are active during the tufting process. This may, for example, be the drive for moving the fabric through the tufting machine as well as the drive for moving a needle bar or the pile delivery system.

The present invention further relates to a method of tufting a fabric. In this method, a tufting machine control file is generated by using the method of preparing a tufting process according to the present invention. This tufting machine control file is then forwarded to the tufting machine selected for carrying out the tufting process, and this tufting machine is operated on the basis of the tufting machine control file for tufting the fabric.

The method of the present invention will now be described with reference to the attached figures, in which.

Figure 1:
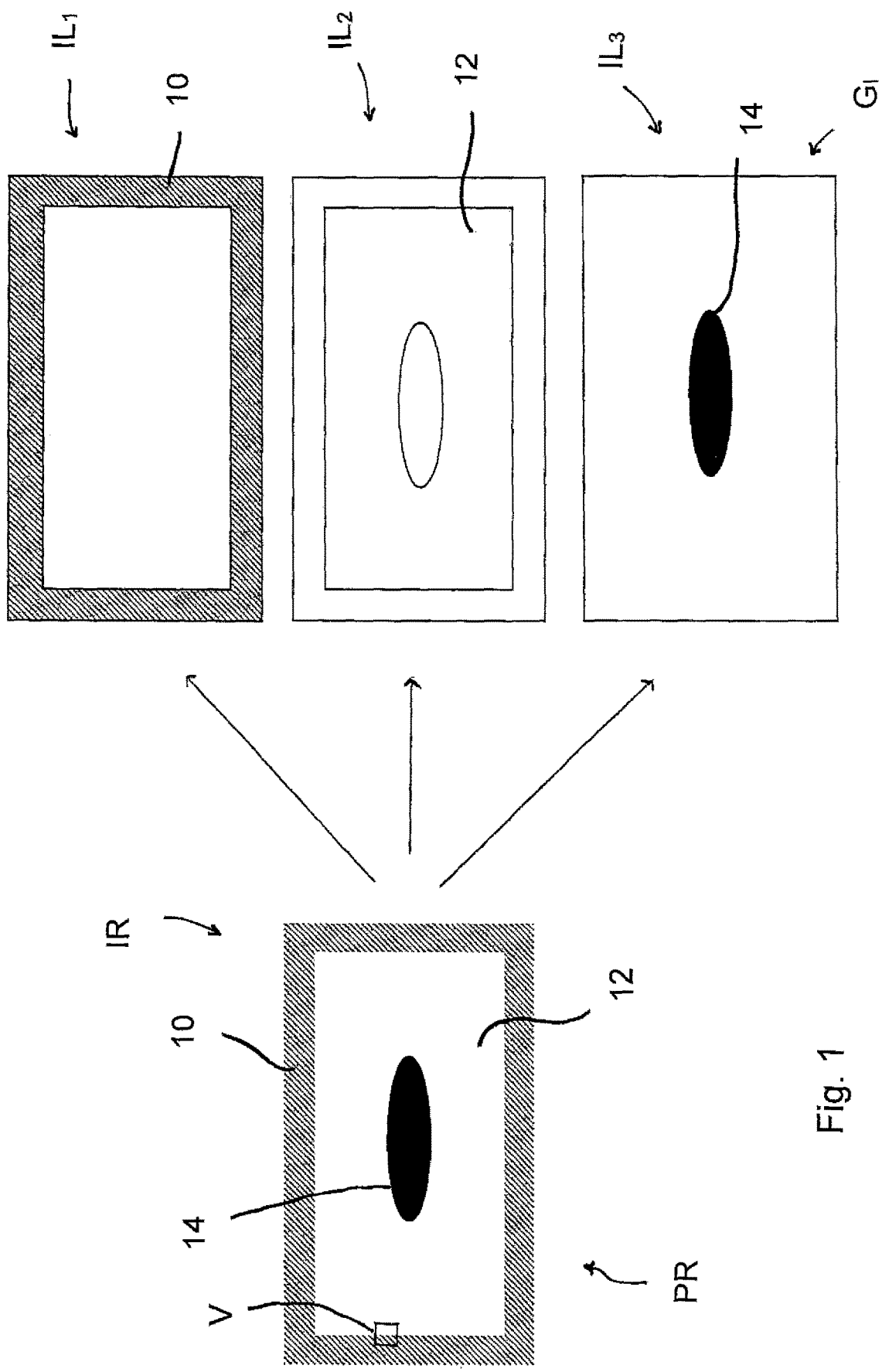
FIG. 1 shows a pattern representation of a fabric to be tufted and three pattern information layers generated on the basis of the pattern representation.

In the left part of FIG. 1, a pattern representation PR of a fabric to be tufted, for example, a carpet, is shown. This pattern representation PR, for example, may be a drawing or a picture showing the real colors of a fabric to be tufted. For example, this fabric may have a gray outer edge region 10 and a black elliptically shaped center region 14. The area between this outer edge region 10 and the center region 14 denoted by 12 may be white.

While the pattern representation PR may be considered as representing any kind of information about the fabric to be tufted, such as for example information about the size (length and/or width and/or length/width-ratio) of the fabric to be tufted and/or the number of pixels to be used in the working direction and/or perpendicular to the working direction of a tufting machine, the pattern representation PR may generally be provided as a pattern information representation IR representing the fabric to be tufted with its true colors and/or with other aspects of the fabric to be tufted. For example, the outer edge region 10 might be a region where only low piles shall be provided, while, in the center region 14, high piles shall be provided and, in the area 12 therebetween, piles of a medium height shall be provided. In this case, the colors used for indicating these three regions 10, 12, 14 are not the true colors of the fabric to be tufted, but are used for indicating a particular kind of information, which, in this example, is information about the pile height which is to be used in these different areas 10, 12, 14. Further, it is to be noted that, for indicating a particular kind of information in the pattern information representation IR, which information might be the true color as well as any other kind of information relating to the piles to be tufted, the pattern information representation IR may be shown with using another coding system, for example, using letters, numbers or other signs in association with the different areas representing different kinds of information. In the following example, this information is represented by a respective color which, for example, might be the true color of the fabric to be tufted.

Based on the pattern representation PR and the pattern information representation IR, respectively, which might be provided as a data file, for example, a bmp picture data file, a plurality of pattern information layers $IL_1$, $IL_2$, and $IL_3$ is generated. If, for example, the pattern representation PR contains three different areas, i.e. three different kinds of information, three such pattern information layers $IL_1$, $IL_2$, $IL_3$ may be generated, each one being associated with one kind of information, for example, one of the colors of the fabric to be tufted. In the example shown in FIG. 1, the pattern information layer $IL_1$ is associated with the gray-colored outer edge region 10, which means that, in this pattern information layer $IL_1$, this gray-colored outer edge region 10 is shown, while all the information associated with other areas is not reflected in this layer. The second pattern information layer $IL_2$ is associated with the white area 12, while the third pattern information layer $IL_3$ is associated with the black center area 14.

It is to be noted that each one of these pattern information layers $IL_1$, $IL_2$, $IL_3$ represents an entity of information, for example, indicating a particular area of the fabric to be tufted and preferably indicating information about the appearance of the fabric to be woven in this particular area, for example, information about the color that should appear in this area. Each one of the pattern information layers $IL_1$, $IL_2$, $IL_3$ may be provided as an entity of data or a data file, respectively, and may be arranged such as to be visualized on a monitor.

When preparing a tufting process for tufting, for example, the fabric having the appearance shown in the left part of FIG. 1, it is essential to have information about the tufting machine that is to be used for carrying out this process and, in particular, to have information about the threading of this tufting machine, i.e. the sequence of the yarns associated with all the needles provided on a needle bar of such a tufting machine. If a plurality of tufting machines is available for selection, one of these machines may be selected and the information about the tufting machine and, in particular, about the threading which is present in this tufting machine may be input into a computer program that is used when preparing the tufting process, which computer program may also be used for generating and/or inputting the pattern representation PR and for generating the pattern information layers $IL_1$, $IL_2$, $IL_3$ on the basis of the pattern representation.

Figure 2:
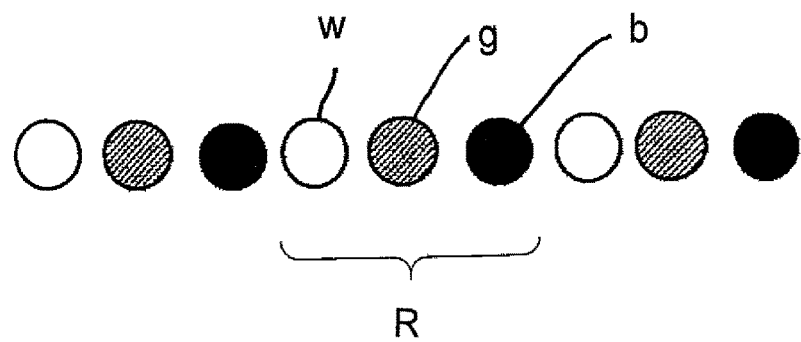
FIG. 2 shows a cross-sectional view of a plurality of yarns provided in a tufting machine and representing a yarn threading.

FIG. 2 shows an example of a yarn threading using three different kinds of yarns, one being a white yarn w, one being a gray yarn g and one being a black yarn b. The yarn threading is such that there is provided a repeat R of three yarns. In each one of the immediately consecutive repeats R, the gray yarn g is positioned next to the white yarn w and the black yarn b is positioned next to the gray yarn g such that the gray yarn g is positioned between the white yarn w and the black yarn b.

Figure 3:
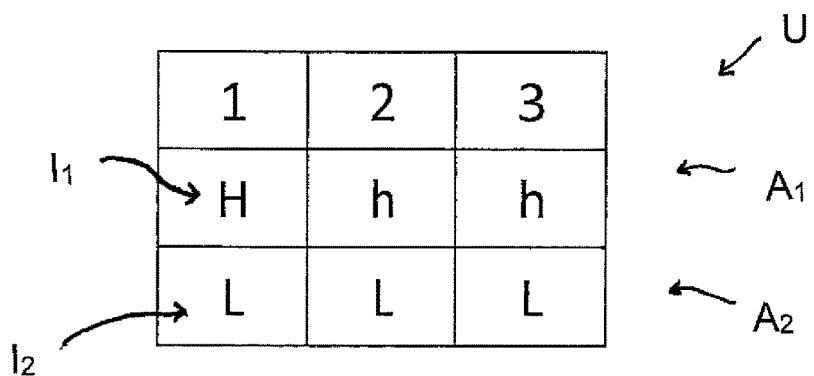
FIG. 3 shows a tufting instruction unit associated with three immediately adjacent yarns and/or three piles to be tufted immediately adjacent to each other.

FIG. 3 shows one example of a tufting instruction unit U which contains tufting instruction in association with three immediately adjacent piles to be tufted. These may be piles which are to be tufted by three immediately adjacent needles, i.e. three immediately adjacent yarns, or may be piles which are to be tufted by three subsequent stitches carried out by one and the same needle of a needle bar. In the example shown in the figures, the tufting instruction unit U is considered as being a tufting instruction unit U which is associated with three immediately adjacent yarns, i.e. needles, to which such yarns are threaded.

The tufting instruction unit U contains tufting aspect instructions $I_1$ and $I_2$ associated with two different tufting aspects $A_1$ and $A_2$. The first tufting aspect $A_1$, for example, may be the height of the piles to be tufted. In this case, the tufting aspect instruction $I_1$, in association with each one of the three piles to be tufted, indicates the pile height. In the shown example, the first pile "1" shall be a high pile, which is reflected by the tufting aspect instruction $I_1$ "H". Piles "2" and "3" shall be low piles, which is reflected by the tufting aspect instruction $I_1$ "h". It is to be noted that the number of different possible pile heights, of course, depends on the tufting machine which is used for carrying out the tufting process. For example, the machine may be arranged for generating piles of two or three different pile heights. Another tufting machine may be arranged for generating any pile height between a minimum pile height and a maximum pile height.

The second tufting aspect $A_2$ relates to the type of the piles to be tufted. In the shown example, all the three piles shall be loops indicated by the tufting aspect instruction $I_2$ "L". Again, the number of different pile types depends on the tufting machine used for carrying out the tufting process. For example, this machine may be arranged for generating loops "L" or for generating cut piles.

Figure 4:
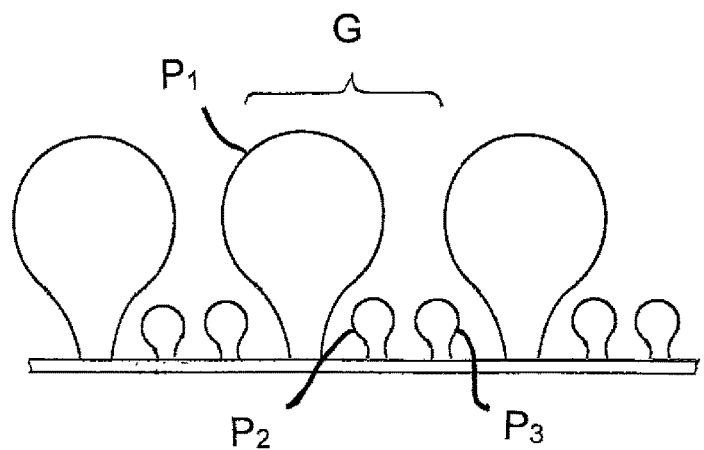
FIG. 4 shows a group of piles tufted on the basis of the tufting instruction unit of FIG. 3.

When assigning the tufting instruction unit U shown in FIG. 3 to the repeats R of the yarn threading shown in FIG. 2, a row of loops will be generated by the needles of a needle bar having the structure shown in FIG. 4. The first pile $P_1$ will be a high loop, while piles $P_2$ and $P_3$ will be low loops. If the tufting aspect instruction unit U further is assigned to each one of the repeats R, the high loop $P_1$ will be made of the white yarn w, while the two low loops $p_2$ and $p_3$ will be made of the gray yarn g and the black yarn b, respectively. This will lead to an overall appearance in which the high loops or piles $P_1$ will substantially cover the low loops or piles $P_2$ and $P_3$, such that the outer appearance, in this case the color, of the fabric tufted by using this tufting instruction unit U will be dominated by the piles $P_1$ having a white color.

For tufting a fabric having a gray color, a tufting instruction unit U may be provided in which, in association with the second pile, the first tufting aspect instruction $I_1$ indicates "H", i.e. a high pile, while, in association with piles $P_1$ and $P_3$, the tufting aspect instruction $I_1$ indicates a low pile "h". If a black fabric is to be tufted, only the third pile will have the tufting aspect instruction $I_1$ "H" associated therewith.

It is to be noted that a plurality of other kinds of tufting instruction units U may be defined and stored. The structure of these tufting instruction units may depend on the yarn threading and the repeats R and, of course, may depend on the tufting machine and, in particular, the needle bar used for carrying out a tufting process. If, in association with a particular fabric to be tufted and one or a plurality of tufting instruction units U which shall be used for tufting such a fabric, a particular yarn threading is necessary, according to a further aspect, this yarn threading may also be selected or defined. For doing this, the yarn threading may be shown in a group of yarn layers wherein each of the yarn layers shows yarns having the same color. By substituting one or a plurality of these yarns contained in the various yarn layers, the yarn threading may be changed during the method of preparing the tufting process. If the yarn threading is changed during this method, then, of course, care has to be taken that, when carrying out the tufting process, the same threading will be present on the tufting machine.

After having defined the various pattern information layers $IL_1$, $IL_2$, $IL_3$ on the basis of the pattern representation PR and after having defined one or a plurality of tufting instruction units U, in a next step of the method of preparing a tufting process, tufting instruction units will be assigned to the various pattern information layers $IL_1$, $IL_2$, $IL_3$. For example, the tufting instruction unit U shown in FIG. 3, which, in combination with the repeat R shown in FIG. 2, will lead to the generation of white high piles and therefore will lead to a primarily white tufted area, will be assigned to the area 12 represented in the second pattern information layer $IL_2$. This can be done either by selecting this entire area 12 and assigning the tufting instruction unit U shown in FIG. 3 to this entire area such that a plurality of such tufting instruction units U will be assigned side by side and following each other to this area 12. Alternatively, to each pixel of this area 12, a corresponding tufting instruction unit U may be assigned such that, step by step, the entire area 12 will be filled with such tufting instruction units U. It is to be noted that, in this example, one such pixel may be defined such as to relate to three immediately adjacent piles to be tufted in the area 12 or such as to relate to one single stitch to be carried out by a tufting machine.

In the same manner, tufting instruction units U can be assigned to the area 10 represented by pattern information layer $IL_1$ and to the black area 14 represented by pattern information layer $IL_3$. By doing this, finally, tufting instruction units will be assigned to the entire fabric to be tufted such that, for each single pile which is to be generated during the tufting process, information about the intended pile height and about the intended pile type will be available.

Figure 5:
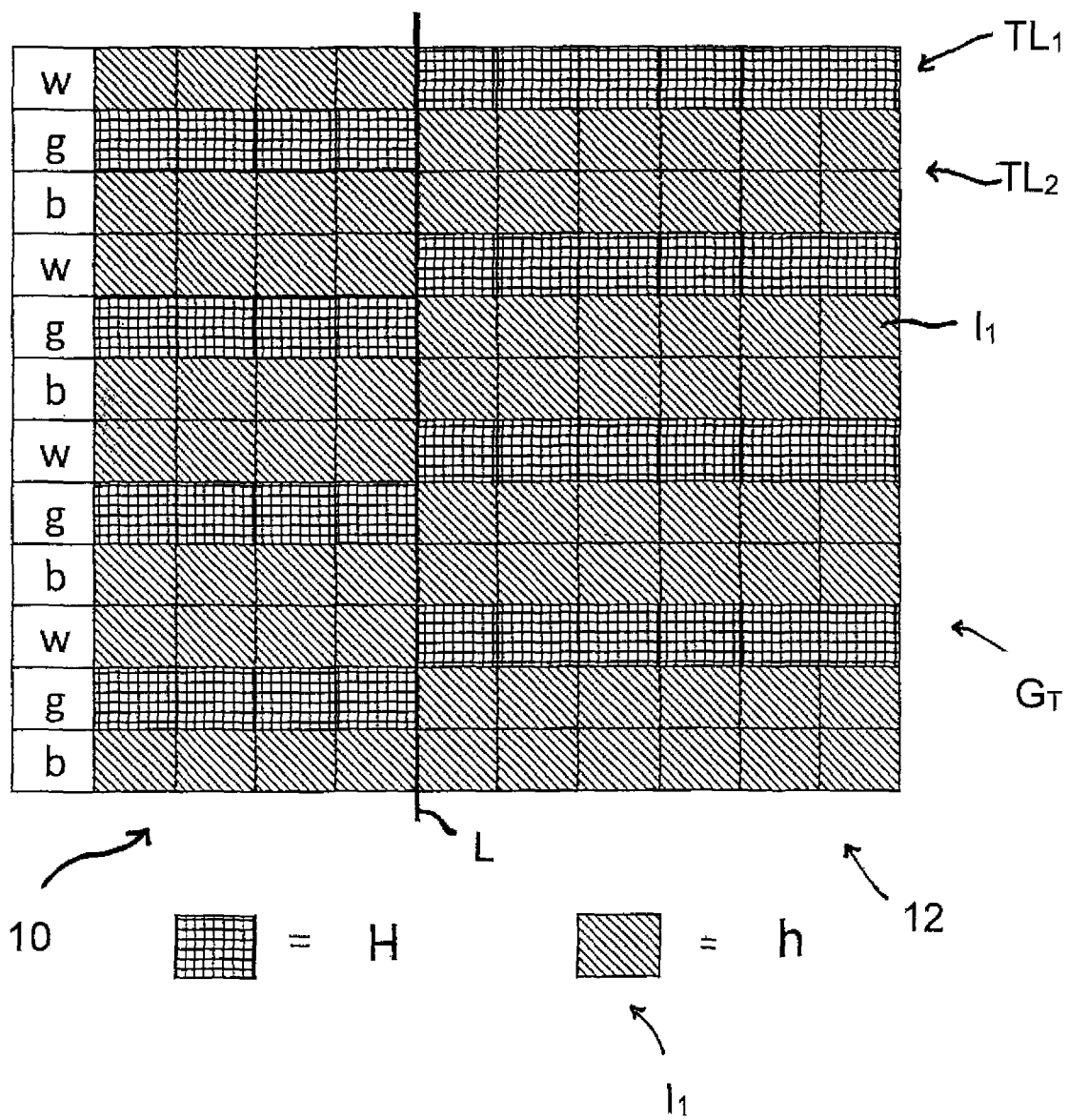
FIG. 5 shows, in a superimposed manner, tufting aspect instruction layers of a group of tufting aspect instructions.
Figure 6:
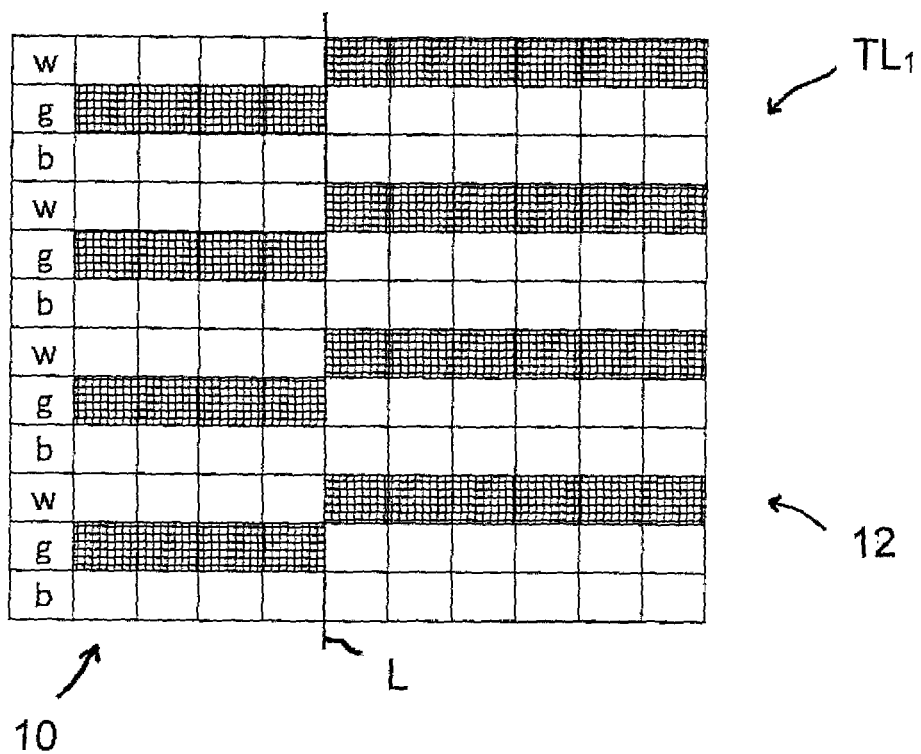
FIG. 6 shows a first one of the tufting aspect instruction layers.
Figure 7:
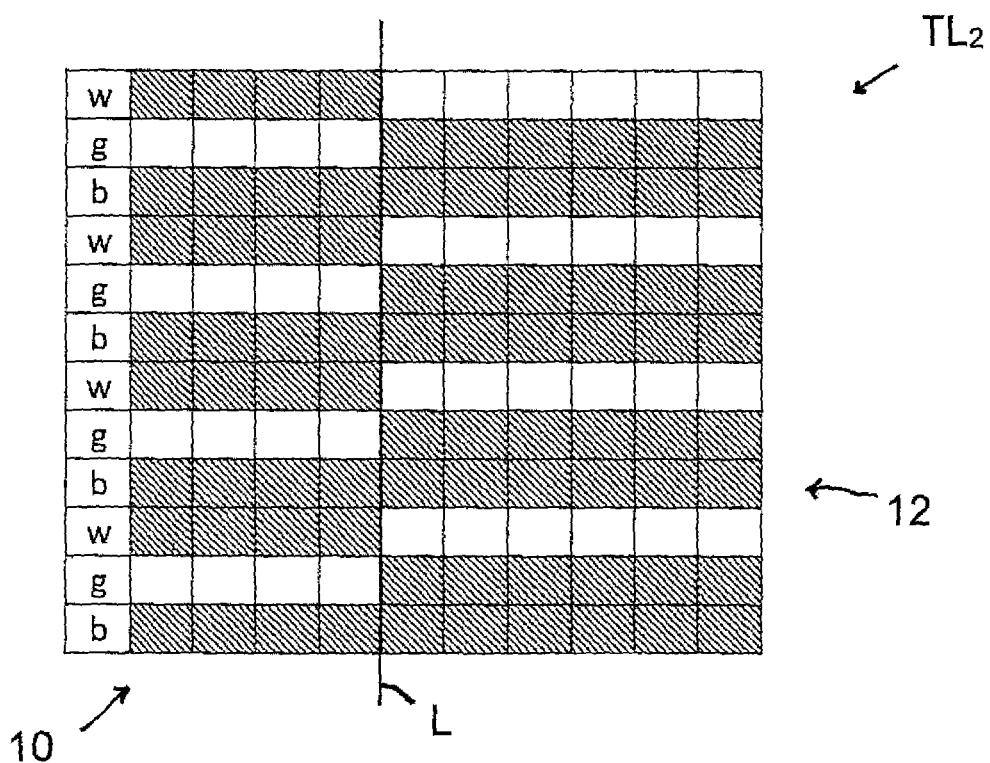
FIG. 7 shows a second one of the tufting aspect instruction layers.

In the method of the present invention, at least one group $G_T$ of tufting aspect instruction layers is provided. Preferably, in association with each tufting aspect, one such group $G_T$ is provided. FIGS. 5 to 7 show one such group $G_T$ associated with the first tufting aspect $A_1$, i.e. the pile height. This group $G_T$ contains one tufting aspect instruction layer $TL_1$, $TL_2$ in association with each one of the tufting aspect instructions relating to one particular tufting aspect, in this case the tufting aspect This means that there is one tufting aspect instruction layer $TL_1$ associated with the tufting aspect instruction $I_1$ "H", and there is one tufting aspect instruction layer $TL_2$ associated with the tufting aspect instruction $I_1$ "h". Of course, a corresponding group of tufting aspect instruction layers can and will be associated with the second tufting aspect $A_2$, i.e. the pile type.

While FIG. 5 shows the two tufting aspect instruction layers $TL_1$ and $TL_2$ in a superimposed manner, FIGS. 6 and 7 show these two layers separately. It is to be noted that the area shown in FIGS. 5 to 7 corresponds to the area denoted by the square V in FIG. 1. In this area, there is a transition from the outer edge region 10 to the white-colored area 12. This transition is indicated by a transition line L shown in FIGS. 5 to 7.

The area on the right side of the transition line L is the white-colored area 12, while the area on the left side of this transition line L is the gray-colored outer edge region 10. Each line of these tufting aspect instruction layers $TL_1$, $TL_2$ represents one of the yarns of the yarn threading and therefore corresponds to the working direction of a tufting machine. Each column of these tufting aspect instruction layers $TL_1$, $TL_2$ corresponds to stitches carried out by immediately consecutive needles, for example, by using the yarn threading shown in FIG. 2. Each square shown in the tufting aspect instruction layers represents one stitch carried out by the needles of a needle bar of a tufting machine and therefore represents one pile which is to be generated during the tufting process. It is to be noted that there may even be stitches where no pile will be generated, which, for example, might be indicated as being a pile having a pile height When applying the tufting instruction unit U of FIG. 3 using the yarn threading shown in FIG. 2 to the area 12 of the pattern information layer $IL_2$, the tufting aspect instructions $I_1$, $I_2$ will be assigned to the associated tufting aspect instruction layers $TL_1$, $TL_2$. This means that each stitch at which, for example, a high pile will have to be generated will be indicated in the tufting aspect instruction layer $TL_1$ associated with the tufting aspect instruction $I_1$ "H". Each stitch for generating a low pile will be indicated in the tufting aspect instruction layer $TL_2$ associated with the tufting aspect instruction $I_1$ "h". This can be seen in FIGS. 6 and 7. By superimposing the two tufting aspect instruction layers $TL_1$ and $TL_2$, which is shown in FIG. 5, a representation can be obtained in which, for each single stitch to be carried out and therefore for each pile to be tufted, there will be information about the desired pile height. Correspondingly, there will be tufting aspect instruction layers of a second group containing the information about the pile types of all the piles to be tufted.

The tufting aspect instruction layers can be considered as being entities of information of data indicating at which position or stitch which tufting aspect instruction will have to be applied and therefore which characteristics the tufted pile will have. These tufting aspect instruction layers may be visualized on a monitor for showing, for example, representations corresponding to the ones shown in FIGS. 5 to 7 and, for example, the coloring of the entire fabric to be tufted. The particular tufting aspect instruction layers which shall be used for such a visualization may be selected such that, for example, only those layers showing where high piles and where loops shall be generated are shown in a superimposed manner. By using the information contained in all of the tufting aspect instruction layers or only in a part of the tufting aspect instruction layers and by additionally using the information contained in the pattern information layers and, for example, indicating the true colors of a fabric to be tufted, and/or by using information relating to the yarn threading, a visualization may be generated which only reflects particular information contained in all these selected layers or a visualization of the total fabric to be tufted can be generated.

On the basis of such visualizations, either of the entire fabric or of particular layers, one can recognize whether, at particular locations or areas, changes of the tufting aspect instruction associated with such locations or areas might be advantageous for enhancing the appearance of the fabric to be tufted. If such a change is to be carried out, this can be done, for example, by stepping into one particular tufting aspect instruction layer or a superimposition of a plurality of such layers and by inputting the information where a change has to be carried out and which change has to be carried out. For example, it might be that a high pile which is to be generated in the area 12 immediately adjacent to the transition line L is to be replaced by a low pile. This can be done either by inputting a low pile at this particular location in the tufting aspect instruction layer $TL_2$, which will automatically lead to a deletion of the high pile at this location indicated in the tufting aspect instruction layer $TL_1$, or by first deleting this high pile and then inputting the low pile. This substitution of tufting aspect instructions in the various layers either can be done pile by pile or can be done for selected areas or for all piles having the same height. After having substituted one or a plurality of the tufting aspect instructions associated with particular piles to be tufted, the corresponding layers or all the layers or the superimposed layers may once more be visualized for checking whether the desired appearance of the fabric to be tufted will be obtained or whether any further changes will be necessary.

After having carried out all such changes if necessary, on the basis of the tufting aspect instruction layers of all the groups of tufting aspect instruction layers, in particular on the basis of those layers having tufting aspect instructions assigned thereto, a tufting machine control file can be generated which contains all the information and commands necessary for controlling the tufting machine selected for carrying out the tufting process. This control file can be sent to or input into the controller of the machine for then carrying out the tufting process on the basis of this control file.

This method can be carried out by using a computer program allowing a user to input the necessary information, in particular to input the pattern representation PR, and to define or select the tufting instruction units that shall be assigned to the various pattern information layers. Such a computer program may provide a plurality of toolbars or tools by means of which various functions or commands can be selected, for example, for selecting a particular tufting machine or for selecting or changing the yarn threading or, after having displayed a particular or a plurality of tufting aspect instruction layers, substituting the tufting aspect instruction associated with a particular location or with particular areas for other tufting aspect instructions. Such a computer program may, for example, be arranged for automatically separating areas of different color and/or structure contained in a pattern representation and associating these areas with different pattern information layers. Further, this computer program may be arranged for automatically assigning the tufting aspect instructions contained in the tufting instruction units assigned to the various pattern information layers to the various tufting aspect instruction layers provided in association with each one of the different types of tufting aspect instruction.

In an alternative embodiment of the method for preparing a tufting process, instead of providing pattern information layers, the tufting aspect instruction layers may be used for directly inputting the information about the tufting aspect instructions contained in or represented by the pattern representation into these layers. For example, all the tufting aspect instruction layers may be "empty", i.e. may contain no information about any kind of tufting aspect instruction, but, for example, may contain information about the size (width and/or length) or the width/length-ratio of the fabric to be tufted. This information, for example, may be assigned to the tufting aspect instruction layers on the basis of the pattern representation. Then, step by step, in association with each single pile to be tufted, i.e. each single stitch to be carried out, or in association with particular areas of a fabric to be tufted, the tufting aspect instructions may be entered into the various tufting aspect instruction layers for indicating where, for example, a high pile is to be tufted or where a low pile is to be tufted or where another type of pile is to be tufted. At the end of this way of assigning the tufting aspect instructions to the tufting aspect instruction layers, there will also be a plurality of such layers or superimposed layers reflecting where which kind of pile is to be tufted. After having done this, again there may be generated a visualization on the basis of one or a plurality of these tufting aspect instruction layers for showing the appearance of a fabric which will be tufted on the basis of this information. When generating such a visualization, of course, a yarn threading of a selected tufting machine will be considered as this yarn threading will primarily influence the color appearance of the fabric to be tufted.

When directly assigning the tufting aspect instruction to the various tufting aspect instruction layers in this manner, there might also be the necessity of carrying out changes in particular areas or in particular locations for enhancing the appearance of the fabric to be tufted. This can be done in the manner as defined above by replacing a tufting aspect instruction at a particular location or area by another tufting aspect instruction referring to the same tufting aspect.

In the method of the present invention, the tufting aspect instruction layers may be provided such as to have a default tufting aspect instruction assigned thereto. For example, referring to the first tufting aspect, i.e. the pile height, the default tufting aspect instruction $I_1$ may be "H", such that, in the tufting aspect instruction layer $TL_1$, a high pile will be indicated at each single stitch to be carried out, while the other tufting aspect instruction layer $TL_2$, which is associated with the same tufting aspect, but represents the other kind of tufting aspect instruction, i.e. "h", will be empty.

When using the pattern information layers and assigning the tufting instruction units to the pattern information layers, the default tufting aspect instructions will be overwritten by those tufting aspect instructions contained in the tufting instruction units. In locations having no tufting instruction unit assigned thereto, no changes will appear and the default tufting aspect instruction will be kept. When directly assigning the tufting aspect instructions to the various tufting aspect instruction layers, at those locations or areas to which such a tufting aspect instruction will be assigned, the default tufting aspect instruction will be overwritten.

By using such a default tufting aspect instruction in association with at least one tufting aspect, the amount of work necessary for obtaining the desired appearance of a fabric to be tufted can be reduced. For example, if it is known that the entire fabric should be tufted by using high piles, then, in association with this tufting aspect, the tufting aspect instruction "H" may be used as the default tufting aspect instruction, and it will not be necessary to input any further information relating to this tufting aspect. This means that, when using the tufting instruction units, units of a simpler structure can be used as these units only need to contain information about the pile type, but need not contain any information about the pile height. When directly assigning the tufting aspect instructions to the various tufting aspect instruction layers, the step of assigning instructions relating to this tufting aspect can be omitted completely.

The invention claimed is:

1. Method of preparing a tufting process, comprising the steps of:
    a) providing a pattern representation representative of a fabric to be tufted as a pattern information representation representing the pattern of the fabric to be tufted, step a) comprising:
        a step $a_1$) of providing a group of pattern information layers on the basis of the pattern representation, said group of pattern information layers comprising at least one pattern information layer, each pattern information layer representing areas of the pattern information representation having the same pattern information associated therewith, and
        a step $a_2$) of providing at least one tufting instruction unit, each tufting instruction unit containing at least one tufting aspect instruction,
    b) providing at least one group of tufting aspect instruction layers, each group of tufting aspect instruction layers comprising at least one tufting aspect instruction layer, each tufting aspect instruction layer being associated with a tufting aspect instruction, each tufting aspect instruction referring to a tufting aspect,
    c) assigning at least one tufting aspect instruction to at least one tufting aspect instruction layer by assigning tufting instruction units to at least one pattern information layer and thereby assigning tufting aspect instructions of said tufting instruction units to the associated tufting aspect instruction layers, wherein at least one tufting instruction unit is repeatedly assigned to the same pattern information layer.

2. The method according to claim 1, wherein a first tufting aspect is a pile height and wherein a first tufting aspect instruction referring to the first tufting aspect indicates a height of a pile to be tufted, and/or wherein a second tufting aspect is a pile type and wherein a second tufting aspect instruction referring to the second tufting aspect indicates a type of a pile to be tufted.

3. The method according to claim 2, wherein each tufting aspect instruction layer of a first group of tufting aspect instruction layers represents areas of the pattern representation having the same first tufting aspect instruction associated therewith, and/or wherein each tufting aspect instruction layer of a second group of tufting aspect instruction layers represents areas of the pattern representation having the same second tufting aspect instruction associated therewith.

4. The method according to claim 1, wherein in association with each pattern information layer at least one tufting instruction unit is provided, and/or wherein at least one tufting instruction unit is applied to a plurality of pattern information layers.

5. The method according to claim 1, wherein at least one tufting instruction unit is associated with a group of piles to be tufted, said group of piles comprising at least one pile to be tufted simultaneously by means of immediately adjacent needles arranged on a needle bar of a tufting machine and/or comprises a plurality of piles to be tufted by means of immediately consecutive stitches of the same needle arranged on a needle bar of a tufting machine.

6. The method according to claim 5, wherein a first tufting aspect is a pile height and wherein a first tufting aspect instruction referring to the first tufting aspect indicates a height of a pile to be tufted, and/or wherein a second tufting aspect is a pile type and wherein a second tufting aspect instruction referring to the second tufting aspect indicates a type of a pile to be tufted, and further wherein a tufting instruction unit associated with a group of piles to be tufted comprises for each pile of this group of piles the first tufting aspect instruction and the second tufting aspect instruction.

7. The method according to claim 1, wherein in step b) at least one group of tufting aspect instruction layers is provided such as to represent one predetermined default tufting aspect instruction in association with the entire fabric to be tufted.

8. The method according to claim 1, wherein in step b) at least one group of tufting aspect instruction layers is provided such as to represent one predetermined default tufting aspect instruction in association with the entire fabric to be tufted, and further wherein step c) comprises substituting at least one default tufting aspect instruction for a tufting aspect instruction of a tufting instruction unit assigned to a pattern information layer.

9. The method according claim 1, further comprising the step of substituting at least one tufting aspect instruction of at least one tufting aspect instruction layer for another tufting aspect instruction referring to the same tufting aspect.

10. The method according to claim 1, further comprising the step of selecting one of a plurality of tufting machines and/or comprising the step of determining a yarn threading to be used for tufting the fabric, the yarn threading defining the sequence of yarns in association with needles of a needle bar of a tufting machine.

11. The method of claim 5, further comprising the step of selecting one of a plurality of tufting machines and/or comprising the step of determining a yarn threading to be used for tufting the fabric, the yarn threading defining the sequence of yarns in association with needles of a needle bar of a tufting machine, wherein the yarn threading comprises a yarn repeat, at least one group of piles being a group to be tufted with the yarns of one yarn repeat.

12. The method according to claim 1, further comprising the step of selecting one of a plurality of tufting machines and/or comprising the step of determining a yarn threading to be used for tufting the fabric, the yarn threading defining the sequence of yarns in association with needles of a needle bar of a tufting machine, wherein at least one tufting instruction unit is defined and/or selected on the basis of the information contained in the pattern information layers and/or on the basis of the yarn threading.

13. The method according to claim 1, further comprising the step of generating a visualization of a fabric to be tufted on the basis of the tufting aspect instructions contained in at least one of the tufting aspect instruction layers.

14. The method according to claim 1, further comprising the step of generating a tufting machine control file on the basis of the tufting aspect instructions of all tufting aspect instruction layers having tufting aspect instructions assigned thereto.

15. Method of tufting a fabric, comprising the steps of:
generating a tufting machine control file by using the method of claim 1,
forwarding the tufting machine control file to the tufting machine selected for carrying out the tufting process,
operating the tufting machine on the basis of the tufting machine control file.

* * * * *